United States Patent
Strode et al.

(10) Patent No.: US 11,301,345 B2
(45) Date of Patent: Apr. 12, 2022

(54) DESKTOP SOUND SOURCE DISCOVERY

(75) Inventors: Maureen E. Strode, Somerville, MA (US); Brian M. Stevens, New Boston, NH (US)

(73) Assignee: Red Hat, Inc., Raleigh, NC (US)

( * ) Notice: Subject to any disclaimer, the term of this patent is extended or adjusted under 35 U.S.C. 154(b) by 975 days.

(21) Appl. No.: 13/308,456

(22) Filed: Nov. 30, 2011

(65) Prior Publication Data

US 2013/0139061 A1    May 30, 2013

(51) Int. Cl.
*G06F 11/30* (2006.01)
*G06F 3/16* (2006.01)

(52) U.S. Cl.
CPC ............ *G06F 11/302* (2013.01); *G06F 3/165* (2013.01); *G06F 11/3051* (2013.01); *G06F 3/16* (2013.01); *G06F 11/30* (2013.01)

(58) Field of Classification Search
CPC ... G06F 3/16; G06F 3/00; G06F 3/048; G06F 3/0481; G06F 9/4443; G06F 3/0482; G06F 3/04817; G06F 3/0483; G06F 11/302; G06F 11/3051; G06F 3/165
USPC ........................................................ 715/779
See application file for complete search history.

(56) References Cited

U.S. PATENT DOCUMENTS

| | | | | |
|---|---|---|---|---|
| 7,562,301 B1* | 7/2009 | Wolff et al. | | 715/727 |
| 8,768,494 B1* | 7/2014 | Stroud | | G06F 9/30 |
| | | | | 700/94 |
| 8,813,133 B1* | 8/2014 | DePrez | | G06F 3/0481 |
| | | | | 725/61 |
| 8,891,025 B2* | 11/2014 | Akita | | G06F 3/017 |
| | | | | 345/156 |
| 2004/0117679 A1* | 6/2004 | Kim | | G06F 1/3203 |
| | | | | 713/320 |
| 2004/0201608 A1* | 10/2004 | Ma | | G06F 3/0481 |
| | | | | 715/719 |
| 2005/0210394 A1* | 9/2005 | Crandall et al. | | 715/752 |
| 2006/0123353 A1* | 6/2006 | Matthews et al. | | 715/779 |
| 2006/0210097 A1* | 9/2006 | Yerrace | | G06F 3/165 |
| | | | | 381/119 |
| 2006/0242602 A1* | 10/2006 | Schechter et al. | | 715/838 |
| 2006/0285701 A1* | 12/2006 | Chumbley | | G06F 3/165 |
| | | | | 381/104 |
| 2007/0244586 A1* | 10/2007 | Champion et al. | | 700/94 |
| 2008/0046937 A1* | 2/2008 | Smith | | H04H 20/26 |
| | | | | 725/89 |
| 2008/0052637 A1* | 2/2008 | Ben-Yoseph et al. | | 715/800 |
| 2008/0115066 A1* | 5/2008 | Pavley et al. | | 715/747 |

(Continued)

OTHER PUBLICATIONS

Google.com, "Tab-specific volume control, and sound notification", http://www.google.com/support/forum/p/Chrome/thread?tid=1f5f27aad18886ff&hl=en, Oct. 24, 2009 [retrieved on Apr. 5, 2012].

(Continued)

*Primary Examiner* — Jennifer N Welch
*Assistant Examiner* — Le V Nguyen
(74) *Attorney, Agent, or Firm* — Lowenstein Sandler LLP

(57) ABSTRACT

Multiple applications may execute on a computing device and the computing system may monitor the multiple applications, identify a set e applications generating sound and determine whether at least one sound related criterion is satisfied. If at least one sound related criterion is satisfied, the computing system displays sound indicators for the set of applications generating sound.

27 Claims, 11 Drawing Sheets

(56) References Cited

U.S. PATENT DOCUMENTS

| | | | | |
|---|---|---|---|---|
| 2009/0144648 | A1* | 6/2009 | Oskooi | 715/777 |
| 2009/0177967 | A1* | 7/2009 | Moore et al. | 715/716 |
| 2009/0183120 | A1* | 7/2009 | Ording et al. | 715/823 |
| 2010/0269043 | A1* | 10/2010 | Elliott et al. | 715/716 |
| 2011/0066941 | A1* | 3/2011 | Chipchase et al. | 715/716 |
| 2011/0113337 | A1* | 5/2011 | Liu | G06F 3/0483 715/727 |
| 2011/0196520 | A1* | 8/2011 | Peterson | G06F 3/165 700/94 |
| 2012/0060092 | A1* | 3/2012 | Hill et al. | 715/716 |
| 2012/0110452 | A1* | 5/2012 | Hiipakka | G06F 3/165 715/716 |
| 2012/0110621 | A1* | 5/2012 | Gossweiler, III | 725/46 |
| 2012/0266071 | A1* | 10/2012 | Chen | G06F 3/165 715/727 |
| 2012/0291053 | A1* | 11/2012 | Carter | G06F 3/165 719/328 |
| 2013/0174037 | A1* | 7/2013 | Gao | H04N 7/14 715/719 |

OTHER PUBLICATIONS

"Linux Audio Confusing as Ever"; Dec. 19, 2008; 28 pages; http://www.matusiak.eu/numerodix/blog/2008/12/19/linux-audio-confusing-as-ever/.

Mark Shuttleworth "Window Indicators"; May 3, 2010; 11 pages; http://www.markshuttleworth.com/archives/333.

* cited by examiner

DESKTOP SOUND SOURCE DISCOVERY

TECHNICAL FIELD

Embodiments of the present invention relate to managing a computing system, and more specifically, to managing sound sources on a computing system.

BACKGROUND

Multimedia data such as audio, movies, and images are now prevalent in computing systems. Web pages, presentations, documents, and applications all use multimedia data for a variety of purposes including: communicating information, providing entertainment, notifying users of events, and advertising products. Computing systems are capable of executing multiple applications simultaneously, and each of the multiple applications may use multimedia data. Often, the multimedia data used by or in an application will generate sound. For example, a media player application playing a movie file (e.g., an MPEG file) will generate sound. In another example, a web browser may display multimedia content (e.g., Flash content) which may generate sound.

Although the multimedia data used by applications is often useful, a user of the computing system may be in a situation where sound (e.g., sound from Flash content) may be undesirable. For example, a user may be in the middle of a meeting and may be accessing a web page to obtain information. The web page may contain multimedia data (e.g., an embedded movie) which may generate sound and may disrupt the meeting. In another example, a user may be attending class, and may be using a chat program to communicate with fellow students. The chat program may generate sound in order to notify the user of incoming chat messages and these sounds may disrupt the class.

When a user has multiple applications executing on a computing system, the user may be unable to quickly and/or easily identify which of the multiple applications is generating sound. For example, if a user has fifteen applications executing on the computing device, the user may have to toggle through fifteen application windows in order to determine which of the applications is generating sound, so that the user may disable the sound generation for that application.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

A method and system for managing sound sources on a computing system are described. The computing system may comprise a computing device (e.g., a computer, a laptop computer, a smartphone, a personal digital assistant (PDA)) or a virtual machine (VM)). In one embodiment, multiple applications may be executing on the computing system in conjunction with an operating system. Multiple applications may utilize a sound generating device to generate sound for multimedia content (e.g., a web browser playing Flash content). In another embodiment, a VM executing on the computing system may also generate sound and the VM executing on the computing system may also be an application.

A sound indicator tool may operate on the computing system to monitor the multiple applications and to identify applications which are generating sound. The sound indicator tool may also determine if one or more sound related criteria are satisfied. If the one or more sound related criteria are satisfied, the sound indicator tool may display sound indicators for the plurality of applications which are generating sound. These sound indicators may enable a user of the computing system to quickly and/or easily identify which of the multiple applications executing on the computing system is generating sound. Sound indicators may be displayed on an application window, a VM application window (e.g., a window in which a VM executes), an icon and/or an entry for a VM in a VM manager application (e.g., an entry in a list of VMs), a minimized application window, an application menu, an application group, a workspace, and/or an application switcher, thereby allowing a user to quickly and/or easily identify which applications are generating sound on a computing system and stop these applications from generating sound (e.g., mute a media player, or pause media file playback). The sound indicators may also allow a user to adjust the volume of the sound for an application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
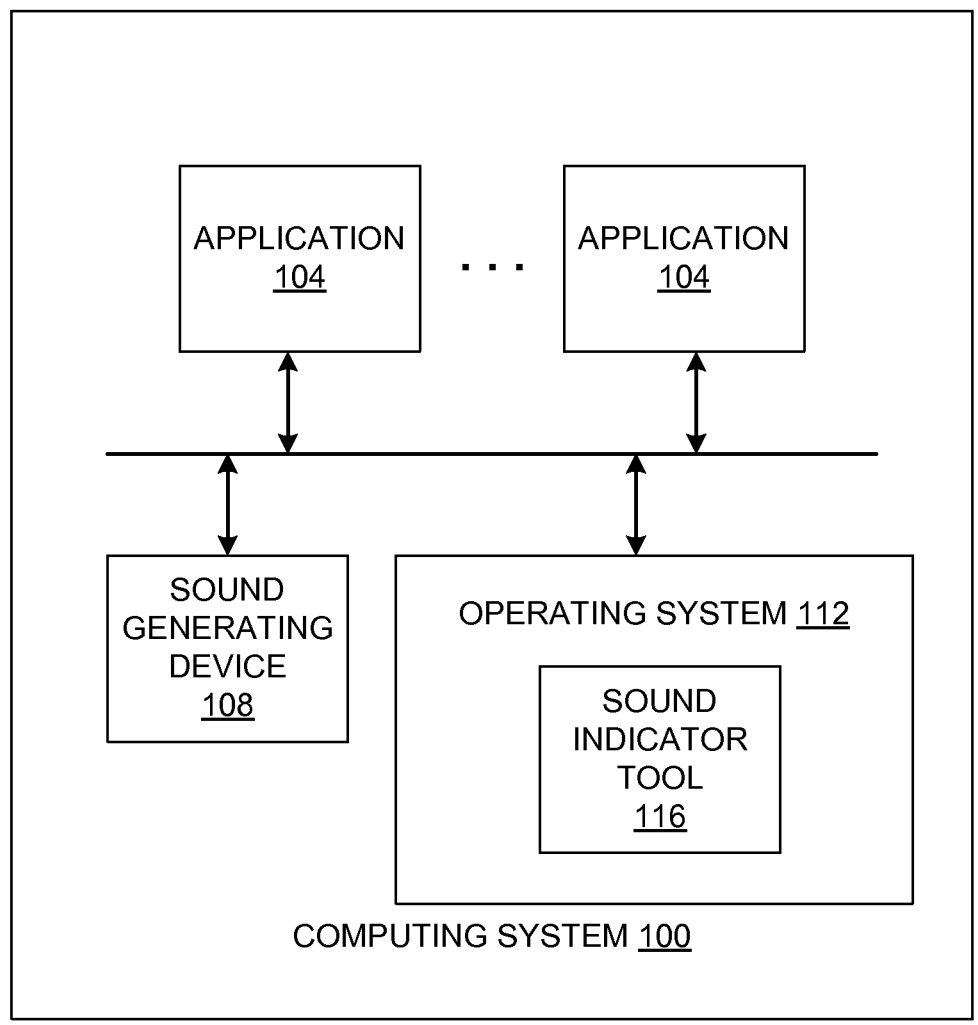
FIG. 1 is a block diagram of an exemplary computing system in which embodiments of the invention may operate.

FIG. 1 is a block diagram of an exemplary computing system 100 in which embodiments of the invention may operate. The computing system 100 may be a personal computer (PC), a server computer, a personal digital assistant (PDA), a smartphone, a laptop computer, or any other machine capable of executing a set of instructions (sequential or otherwise) that specify actions to be taken by that machine. In one embodiment, multiple applications 104 may execute simultaneously on the computing system 100. For example, one or more word processing programs, media players, web browsers, video games, chat programs, etc., may execute simultaneously on the computing system 100.

Any number of applications may execute simultaneously on the computing system 100. For example, tens, hundreds or even thousands of applications may be executing simultaneously on the computing system 100. In addition, the applications executing on the computing system 100 may be from different vendors. For example, a first application may be released/sold by a first vendor, and a second application may be released/sold by a second vendor and both the first application and the second application may execute on the computing system 100 and generate sound.

The computing system 100 includes a sound generating device 108. In one embodiment, the sound generating device 108 may be used by the applications 104 to generate sound (e.g., audio, music, speech, noise, etc.) for multimedia content. The sound generating device 108 may comprise hardware, software, and/or a combination of both. For example, the sound generating device 108 may comprise one or more of a sound card, software drivers for the sound card, speakers, and audio ports (e.g., an audio jack). The computing system 100 may also include an operating system 112 which manages hardware resources (e.g., the sound card), software resources (e.g., drivers, system files, etc.), and manages the execution of the applications 104.

In one embodiment, the operating system 112 may include a sound indicator tool 116. The sound indicator tool 116 may monitor the applications 104 and may identify applications 104 which are generating sound. For example, the sound indicator tool 116 may query the operating system 112 to determine which of the applications 104 are using the sound generating device 108 to generate sound. In another example, the sound indicator tool 116 may communicate with the sound generating device 108 to determine which of the applications 104 are using the sound generating device 108. In a further example, the sound indicator tool 116 may query the applications 104 to determine if any of the applications 104 are using the sound generating device 108.

The sound indicator tool 116 may also determine whether at least one sound related criterion (e.g., whether a volume level of the computing system is not on mute) are satisfied. If at least one sound related criterion is satisfied, the sound indicator tool 116 may display sound indicators for the applications which are generating sound. In one embodiment, the sound indicator tool 116 may display visual indicators (e.g., an icon, image, and/or an animation) to indicate to a user that applications are generating sound.

Although the sound indicator tool 116 is shown as part of the operating system 112 in FIG. 1, in another embodiment, the sound indicator tool 116 may be separate from the operating system 112. For example, the sound indicator tool 116 may itself be an application 104 executing in conjunction with the operating system 112. In another example, the sound indicator tool 116 may comprise a hardware component, a software component, or a combination of both, on the computing system 100.

In one embodiment, the computing system 100 may not be a physical system, but rather a virtual system, such as a virtual machine (VM). A VM may provide a virtual desktop for a user. From the user's point of view, the virtual desktop functions as a physical desktop (e.g., a personal computer) and is indistinguishable from a physical desktop. The VM may include a guest operating system 112 and may run on top of a hypervisor or host operating system executing on a hardware platform of a virtual machine host. The virtual machine host may include one or more VMs. Multiple applications 104 may execute on each VM in conjunction with a guest operating system 112 of the VM. The sound generating device 108 may be a virtual hardware device on the VM and may be used by the multiple applications 104 to generate sound. The sound indicator tool 116 may function as described above, within the VM. In one embodiment, the VM may be an application executing on the computing system 100. A sound indicator may be displayed on an application window, minimized window, an application menu, an application group, a workspace, etc., associated with the VM (which may be an application). The visual indicator displayed for the VM application may indicate that the VM application (e.g., components or emulated applications with the VM) are generating sound. In another embodiment, the sound indicator displayed for a VM application may be used to mute and/or reduce the sound generated by the VM application.

Figure 2:
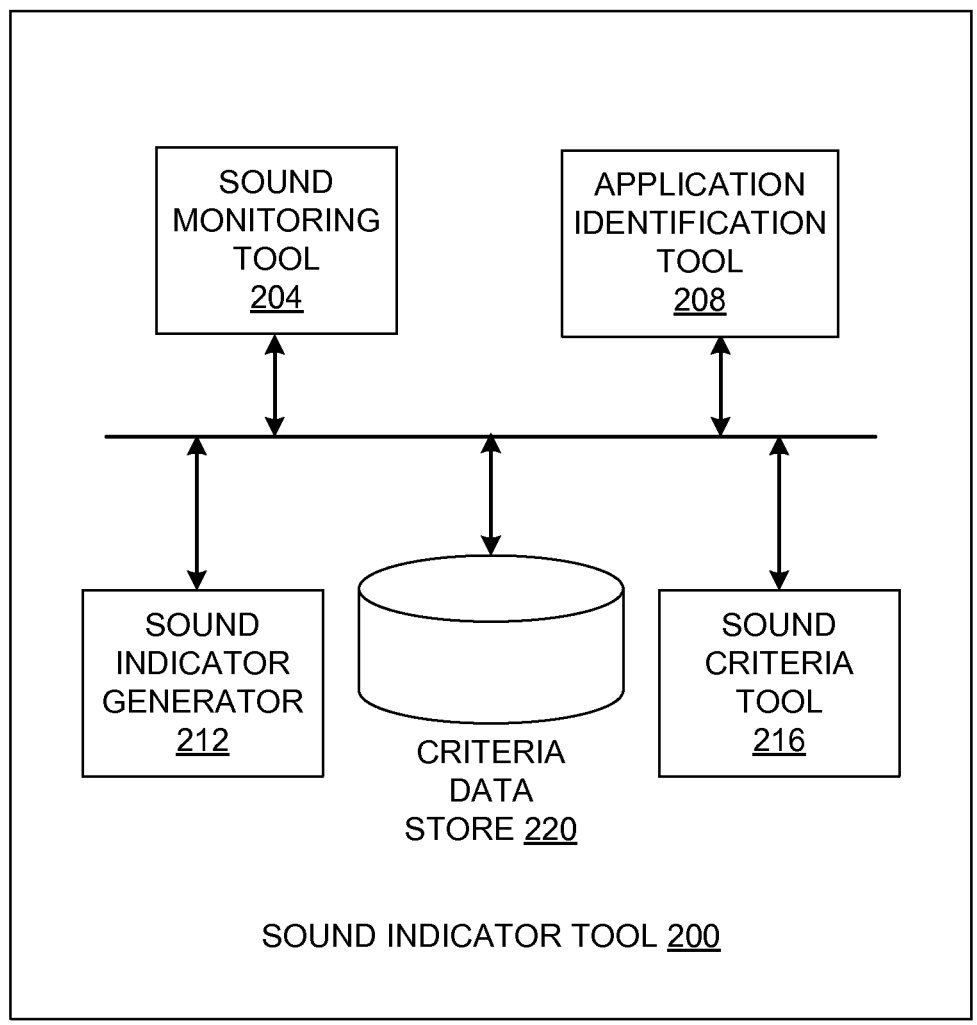
FIG. 2 is a block diagram illustrating one embodiment of a sound indicator tool.

FIG. 2 is a block diagram illustrating one embodiment of a sound indicator tool 200. The sound indicator tool 200 may include a sound monitoring tool 204, an application identification tool 208, a sound indicator generator 212, a sound criteria tool 216, and a criteria data store 220. More or less components may be included in the sound indicator tool 200 without loss of generality.

The sound monitoring tool 204 may monitor multiple applications 104 to determine whether any of the multiple applications 104 are generating sound. For example, the sound monitoring tool 204 may query the sound generating device 108 to determine if any of the multiple applications are using the sound generating device 108 to generate sound. In another example, the sound monitoring tool 204 may query the operating system 112 and the operating system 112 may query the sound generating device 108 to determine if any of the multiple applications 104 are using the sound generating device 108 to generate sound. In one embodiment, if the sound monitoring tool 240 determines that one or more applications 104 are generating sound, it may provide this information to the application identification tool 208.

The application identification tool 208 may identify applications 104 which are generating sound. For example, the application identification tool 208 may query the operating system 112 (which manages the execution of the applications 104) to determine the applications 104 which are using the sound generating device 108 to generate sound. In another example, the application identification tool 208 may query the applications 104 to determine which of the applications 104 are using the sound generating device 108 to generate sound. In one embodiment, the application identification tool 208 may identify applications based on information provided by the sound monitoring tool 204. In another embodiment, the application identification tool 208 may provide information about which applications are generating sound, to the sound indicator generator 212.

The sound criteria tool 216 may determine whether at least one sound related criterion is satisfied. For example, the sound criteria tool 216 may determine whether a volume level of the computing system 100 is not on mute. In another example, the sound criteria tool 216 may determine whether user input for sound related controls (e.g., a software and/or hardware volume controller) is received (e.g., user input to lower the volume level of the computing system). In one embodiment, the sound criteria tool 216 may determine whether at least one sound related criterion is satisfied based on information provided by the application identification tool 206. In another embodiment, the sound criteria tool 216 may provide information about whether at least one sound related criterion is satisfied, to the indicator generator 212.

In one embodiment, the sound criteria tool 216 may obtain one or more sound related criteria to be evaluated from a criteria data store 220. For example, the criteria data store 220 may store data related to one or more sound related criteria which are evaluated by the sound criteria tool 216. A sound related criterion may include, but is not limited to, whether a volume level of the computing system 100 is on mute, whether the volume level of the computing system 100 reaches a certain threshold, and whether a user is accessing sound related controls. The criteria data store 220 may also store data related to the number of sound related criteria which should be satisfied. For example, the criteria data store 220 may contain data which specifies that at least two sound related criteria should be satisfied. In another example, the criteria data store 220 may contain data which specifies which particular sound related criteria should be satisfied. Although the criteria data store 220 is shown as part of sound indicator tool 200, the criteria data store 220 may be located elsewhere in different embodiments. For example, the criteria data store 220 may be located in data storage in the computing system 100. In another example, the criteria data store 220 may be located on a separate machine (e.g., a server) connected to the computing machine 100 via a network.

The indicator generator 212 may cause one or more visual indicators to be displayed to a user. In one embodiment, the computing system 100 may provide a desktop environment for a user. The desktop environment may comprise a graphical user interface with one or more icons, windows, window previews, toolbars, folders, wallpapers, shortcuts, taskbars, application menus, application groups, and/or workspaces. The desktop environment may allow a user to access/manage applications, files, hardware, software, and other components of the computing system 100 using the graphical user interface. The indicator generator 212 may cause one or more visual indicators (e.g., sound indicators) to be displayed to the user in the desktop environment. For example, the desktop environment may comprise one or more application windows, each window associated with an application executing on the computing system 100. A sound indicator (e.g., an icon, an image, an animation, etc.) may be displayed on each application window associated with an application which is generating sound.

Figure 3:
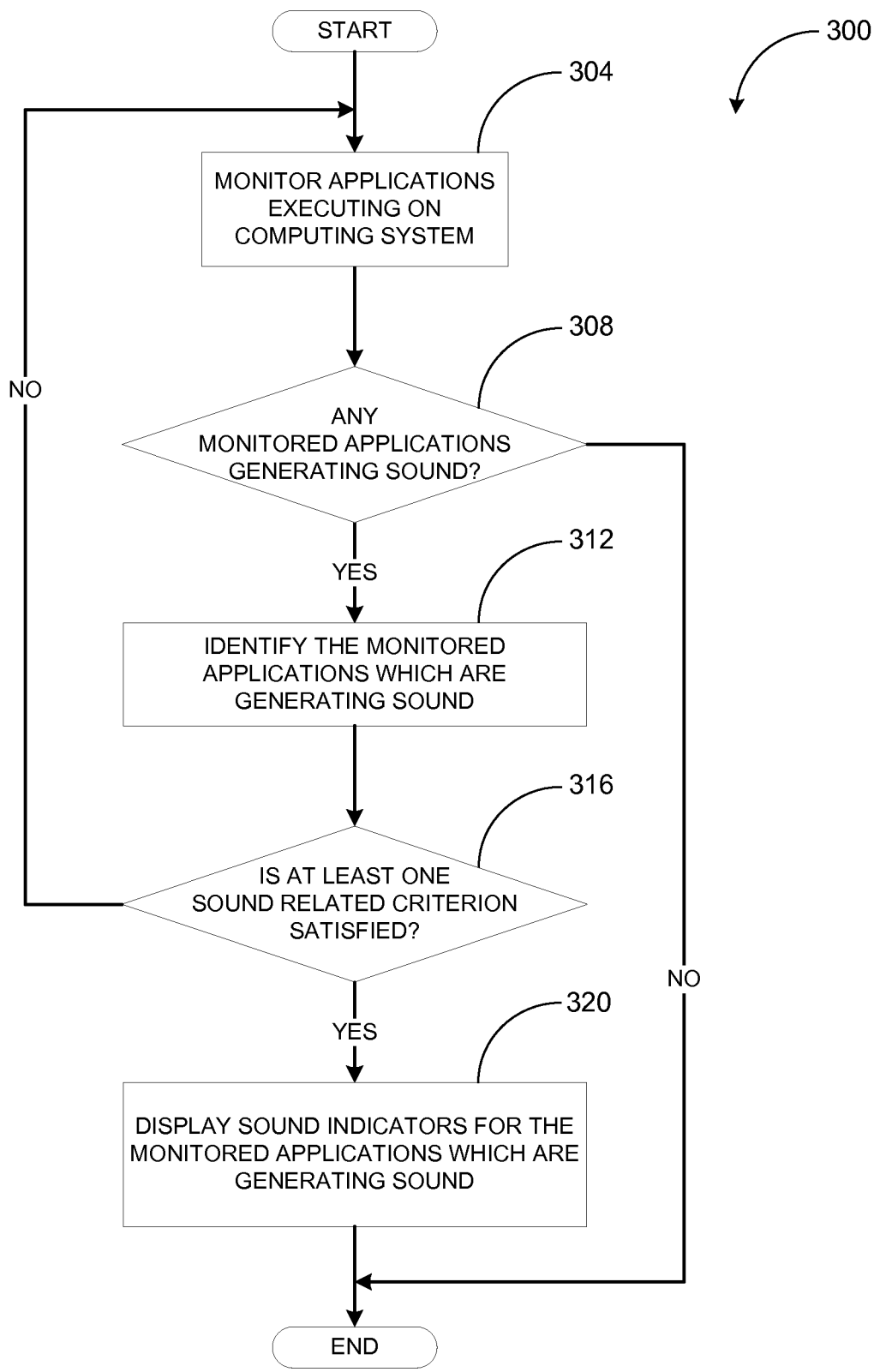
FIG. 3 is a flow diagram illustrating a method for displaying one or more sound indicators, in accordance with one embodiment.

FIG. 3 is a flow diagram illustrating a method for displaying one or more sound indicators, in accordance with one embodiment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a computing system (e.g., the computing system 100 of FIG. 1).

Referring to FIG. 3, the method 300 starts with the computing system monitoring multiple applications executing on the computing system (block 304). At block 308, the computing system determines whether any of the monitored applications are generating sound. If there are no applications executing on the computing system which are generating sound, the method 300 ends. If there are applications executing on the computing system which are generating sound, the computing system identifies all of the monitored applications which are generating sound at block 312.

After identifying the applications which are generating sound, the computing system determines whether at least one sound related criterion is satisfied (block 316). For example, a sound related criterion may be satisfied if the volume level of the computing system is not on mute. In another example, the sound related criterion may be satisfied if user input for sound related controls is received (e.g., a user adjusts and/or accesses a volume control for the computer system). In a further example, the sound related criterion may be satisfied if a user input (e.g., one or more keystrokes and/or mouse clicks) is received. The user input may indicate that a user wants to view the sound indicators (e.g., the user input may be a command issued from a user to display sound indicators for all applications which are generating sound). In one embodiment, the computer system may determine whether multiple sound related criteria are satisfied. For example, the computer system may determine whether a sound level of the computing system is not on mute and whether user input for sound related controls have been received. If at least one sound related criterion is satisfied, the computing system displays sound indicators for the monitored applications which are generating sound at block 320. In one embodiment, the sound indicators are displayed for a period of time after the at least one sound related criterion is satisfied. For example, if the user accesses the volume control (e.g., satisfies a sound related criterion), the sound indicators may be displayed for 5 seconds, 10 seconds, etc., after the user accesses the volume control. Exemplary sound indicators are shown and discussed below in FIGS. 4-10.

In one embodiment, (not shown in the figures), the computing system may not monitor the applications to identify the monitored applications which are generating sound (as shown in blocks 304 and 308). Instead, the computing system may use a sound driver (e.g., a software driver or a software module) associated with the sound generating device (e.g., a sound card) to identify the applications which are generating sound. When an application uses the sound driver to access the sound generating device to generate sound, the sound driver may send a signal (e.g., a start sound signal) to indicate that the application is requesting access to the sound generating device, and is therefore generating sound. When the application stops accessing the sound generating device, the driver may send another signal (e.g., a stop sound signal) to indicate that the application is no longer accessing the sounding generating device, and is therefore not generating sound. The computing system may use the signals from the sound driver to monitor and identify the applications which are generating sound. Based on the signals generated by the sound driver, the computing system may display sound indicators for the applications which are generating sound.

In one embodiment, referring to FIG. 2, the sound monitoring tool 204 may communicate with the sound driver to receive the signals generated by the sound driver. The application identification tool 208 may use these signals to monitor and identify which applications executing on the computing system are generating sound.

Figure 4:
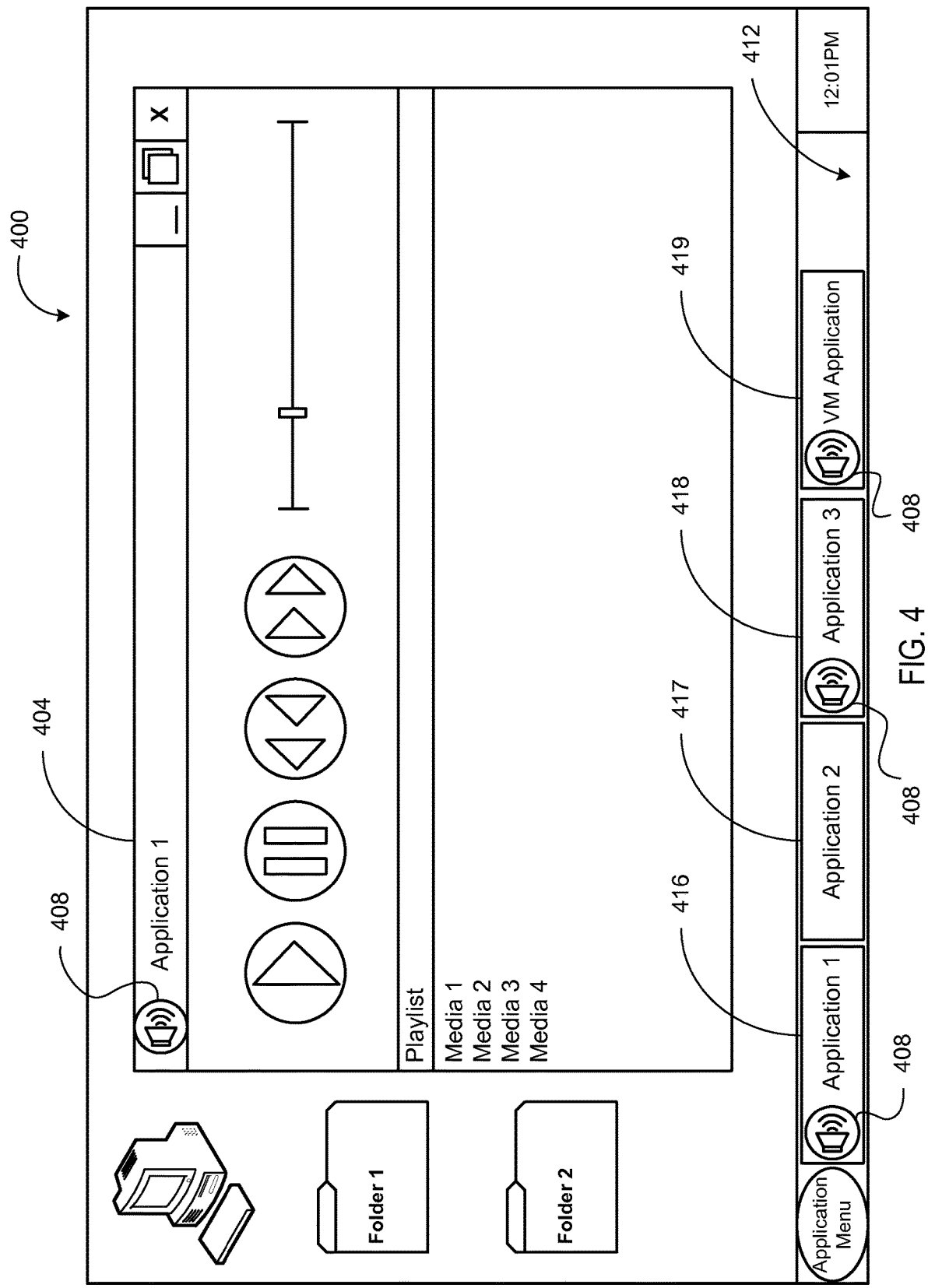
FIG. 4 is a diagram illustrating a first exemplary desktop environment, in accordance with one embodiment.

FIG. 4 is a diagram illustrating a first exemplary desktop environment 400, in accordance with one embodiment. The desktop environment 400 may be provided to a user of a computing system. The desktop environment 400 includes an application window 404 which is associated with an application named "Application 1" executing on a computing system. Application 1 is generating sound and a sound indicator 408 is displayed within the application window to indicate that Application 1 is generating sound. In one embodiment, the sound indicator 408 may comprise an icon, an image, and/or an animation. Although the sound indicator 408 is shown on the top left corner of the application window 404, in other embodiments, the sound indicator 408 may be located in different locations. For example, the sound indicator 408 may be displayed in the center of the application window 404 or on different corners of the application window (not shown in figures).

The desktop environment 400 also includes a taskbar 412. In one embodiment, the taskbar 412 is a component of the desktop environment 400 and may be used by a user to access/manage applications which are executing on the computing system. The taskbar 412 may also provide other functionalities such as providing the current time/date, providing shortcuts to applications, etc. Although the taskbar 412 is shown on the bottom side of the desktop environment 404, in other embodiments, the taskbar 412 may be located in different locations in the desktop environment 404. For example, the taskbar 412 may be located at the top, left or right sides of the desktop environment 404.

The taskbar 412 includes minimized application windows 416, 417, 418 and 419. The minimized application windows 416, 417, 418, and 419 may be associated with applications executing on the computing system. The minimized application window 419 is associated with a VM (e.g., a VM executing as an application) on the computing system. Minimized application window 416 is associated with Application 1 which is executing on the computing system. Minimized application window 417 is associated with Application 2 which is executing on the computing system. Minimized application window 418 is associated with Application 3 which is executing on the computing system. The application windows for Application 2, Application 3, and the VM Application may be hidden from user view. However, the taskbar 412 may still display the minimized application windows 417, 418, and 419 even though the application windows for Application 2, Application 3, and the VM Application are hidden from the user view. In addition, although the application window for Application 1 is not hidden from the user view, the taskbar 412 may still display the minimized application window 416 associated with Application 1.

As discussed above, Application 1, Application 3, and the VM application are generating sound. Sound indicators 408 are displayed within the minimized application windows 416, 418, and 419 to indicate that Application 1, Application 3, and the VM Application are generating sound. Although the sound indicators 408 are shown on the left side of the application minimized application windows 416, 418, and 419, the sound indicators 408 may be located in other positions in other embodiments. For example, the sound indicators 408 may be located on the right side of minimized application windows 416, 418, and 419 (not shown in figures).

In one embodiment, the sound indicators 408 may allow a user to adjust the volume of an application that is generating sound. For example, if a user clicks on the sound indicator 408 displayed within the minimized application window 416, the user may mute the sound generated by the application associated with the minimized application window 416. In another example, if the user clicks on the sound indicator 408 displayed within the minimized application window 416, a volume bar may be displayed to the user to allow the user to increase and/or decrease the volume of the sound generated by the application associated with the minimized application window 416.

Figure 5:
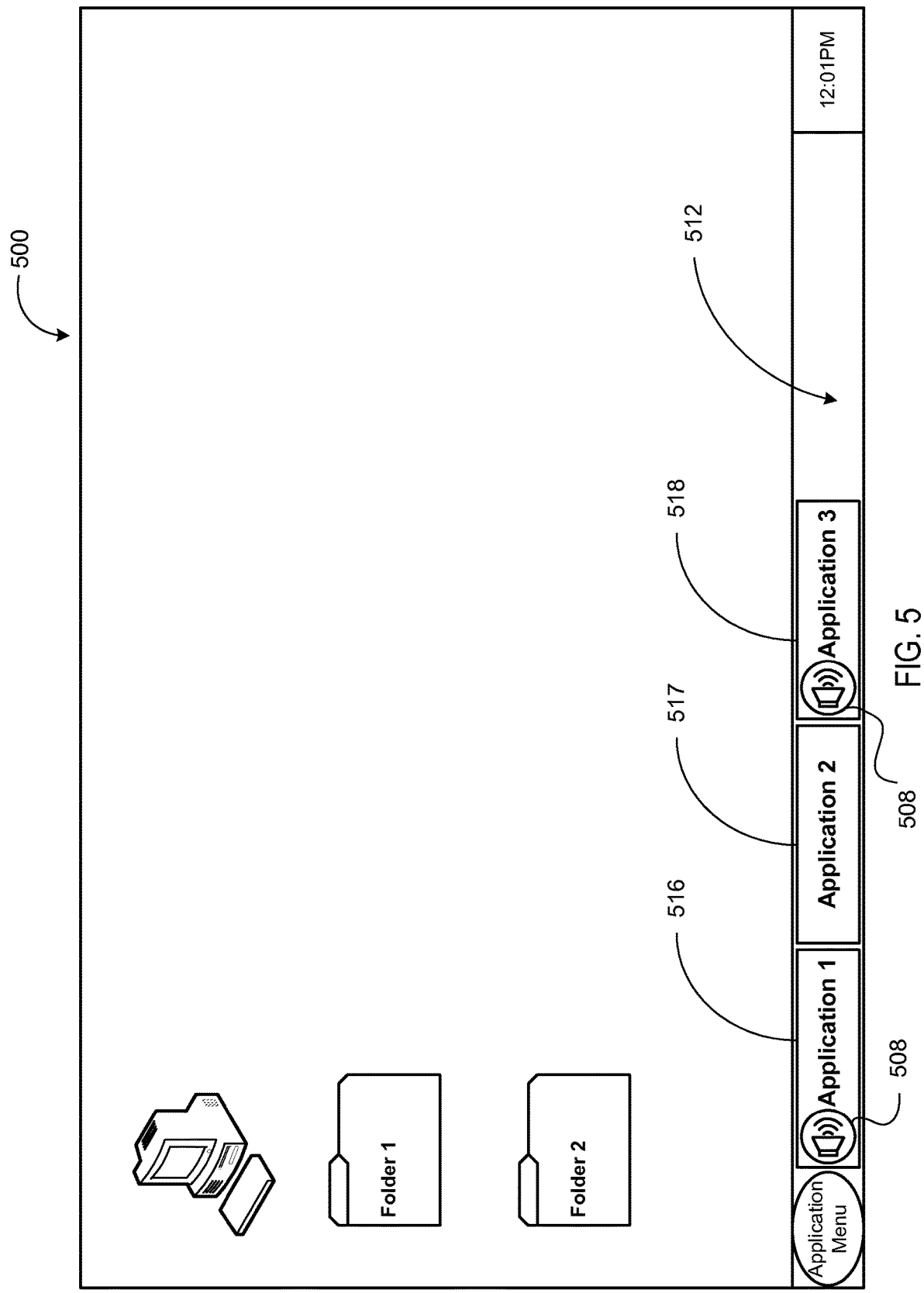
FIG. 5 is a diagram illustrating a second exemplary desktop environment, in accordance with one embodiment.

FIG. 5 is a diagram illustrating a second exemplary desktop environment 500, in accordance with one embodiment. Similar to FIG. 4, the desktop environment 500 includes a taskbar 512. In the desktop environment 500, the application windows associated with Application 1, Application 2, and Application 3 are hidden from user view and the minimized application windows 516, 517, and 518 associated with Application 1, Application 2, and Application 3 are shown on the taskbar 512. Application 1 and Application 3 are executing on the computing system and generating sound. Sound indicators 508 are displayed in the minimized application windows 516 and 518, which are associated with Application 1 and Application 3, respectively. As discussed above, sound indicators 508 may allow a user to adjust the volume of the sound generated by an application that is generating sound (e.g., by muting the sound generated by the application or by increasing/decreasing the volume of the sound generated by the application).

Figure 6:
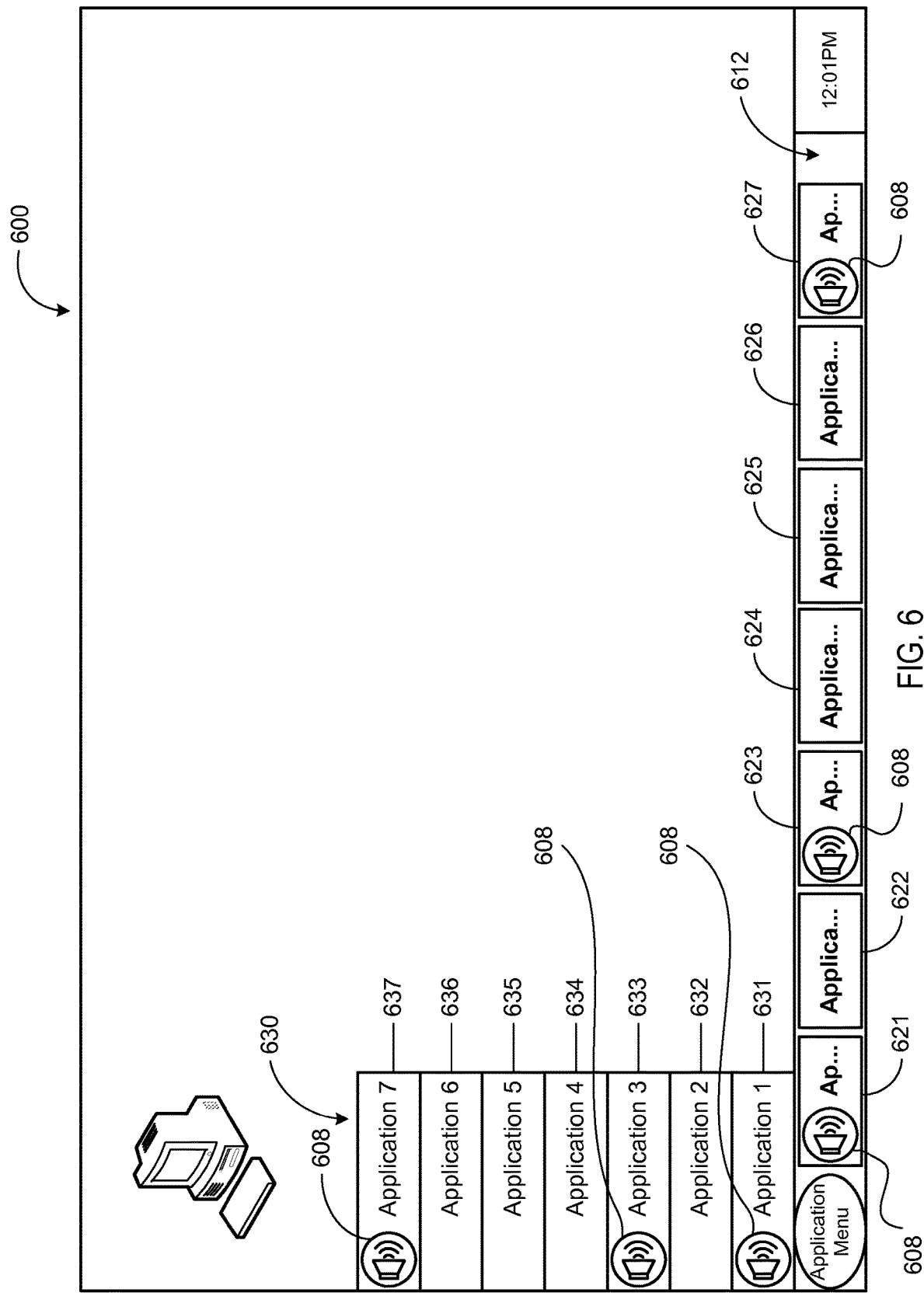
FIG. 6 is a diagram illustrating a third exemplary desktop environment, in accordance with one embodiment.

FIG. 6 is a diagram illustrating a third exemplary desktop environment 600, in accordance with one embodiment. Similar to FIG. 5, the desktop environment 600 includes a taskbar 612. In the exemplary desktop environment 600, the application windows associated with Application 1, Application 2, Application 3, Application 4, Application 5, Application 6, and Application 7 are hidden from user view and the minimized application windows 621, 622, 623, 624, 625, 626, and 627 are shown on the taskbar 612, respectively. Application 1, Application 3, and Application 7 are generating sound and sound indicators 608 are displayed in the minimized application windows 621, 623, and 627, which are associated with Application 1, Application 3, and Application 7, respectively.

As shown in FIG. 6, the minimized application windows 621, 622, 623, 624, 625, 626, and 627 do not display the full names of the applications which are associated with the minimized application windows. For example, Application 1 is associated with minimized application window 621 but only the text "Ap . . . " is displayed in the minimized application window 621. However, the names of applications which are installed on and/or executing on the computing system may be displayed in the application menu 630.

In one embodiment, the application menu 630 may comprise a graphical user interface component which allows users to access and/or launch (e.g., start) applications. For example, the application menu 630 may include shortcuts which may be used to launch applications. Application menu 630 contains application menu entries 631, 632, 633, 634, 635, 636, and 637. In one embodiment, the application menu entries 631, 632, 633, 634, 635, 636, and 637 may comprise shortcuts for launching Applications 1 through 7 respectively.

As discussed above, Application 1, Application 3, and Application 7 are executing on the computing system and are generating sound, as illustrated by sound indicators 608 displayed in the application menu entries 631, 633, and 637, respectively. Also as discussed above, sound indicators 608 may allow a user to adjust the volume of the sound generated by an application that is generating sound (e.g., by muting the sound generated by the application or by increasing/decreasing the volume of the sound generated by the application).

Figure 7:
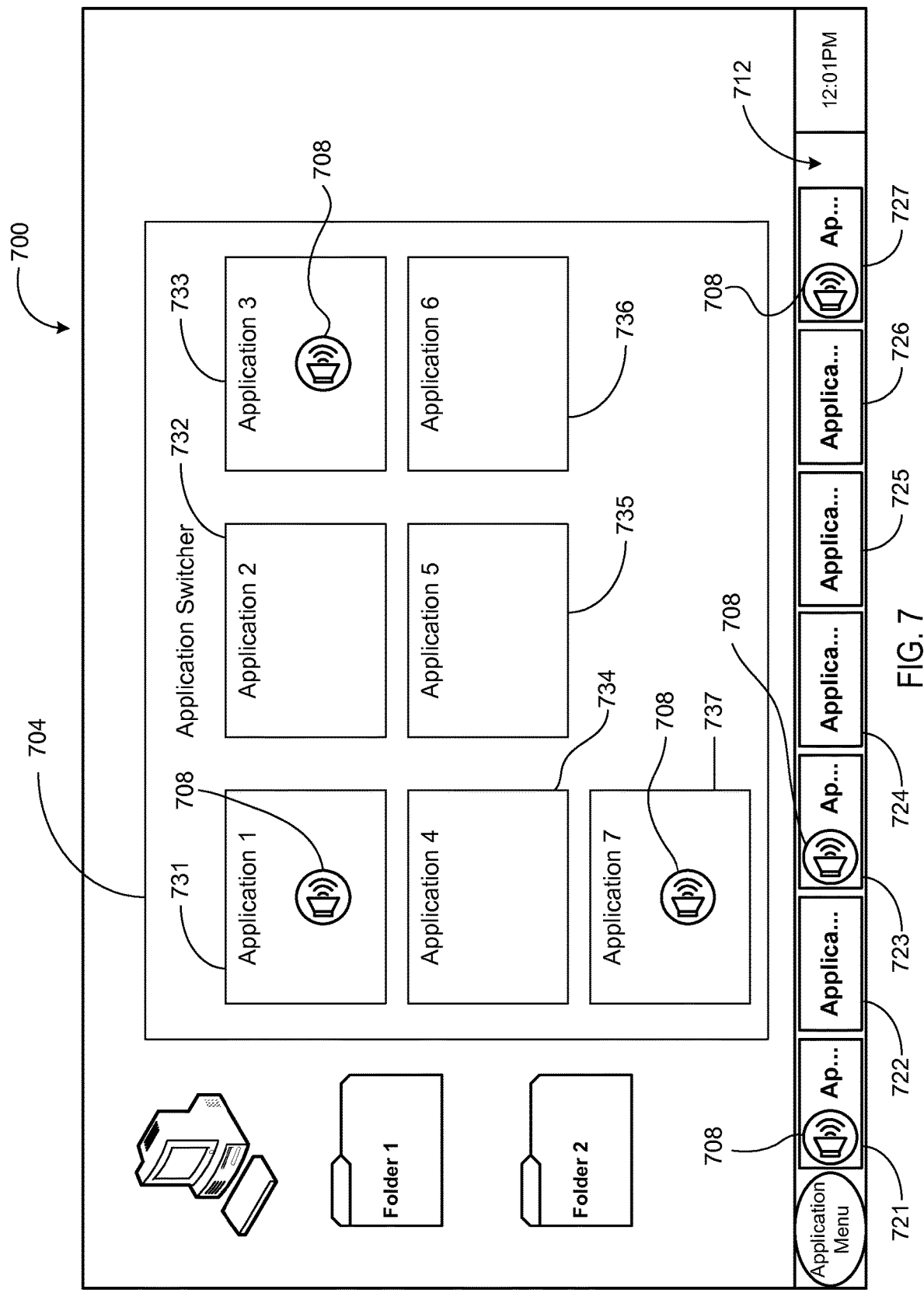
FIG. 7 is a diagram illustrating a fourth exemplary desktop environment, in accordance with one embodiment.

FIG. 7 is a diagram illustrating a fourth exemplary desktop environment 700, in accordance with one embodiment. Similar to FIG. 6, the desktop environment 700 includes a taskbar 712. In the exemplary desktop environment 700, the application windows associated with Applications 1 through 7 are hidden from the user view and the minimized application windows 721, 722, 723, 724, 725, 726, and 727 are shown on the taskbar 712, respectively. Application 1, Application 3, and Application 7 are generating sound and sound indicators 708 are displayed in the minimized application windows 721, 723, and 727, which are associated with Application 1, Application 3, and Application 7, respectively.

The desktop environment 700 also includes a task switcher 704. In one embodiment, the task switcher 704 may be used by a user to switch between multiple applications which are executing on the computing system. For example, the task switcher 704 may be accessed when a user presses the keys "Alt"+"Tab." The user may then cycle through applications which are displayed in the task switcher by pressing the "Tab" button while holding down the "Alt" button. The task switcher 704 may include window previews 731, 732, 733, 734, 735, 736, and 737. In one embodiment, a window preview may comprise a representation of an executing application which is associated with the window preview. For example, a window preview may comprise an icon or a symbol associated with an executing application. In another example, a window preview may comprise a small image of a window associated with an executing application (e.g., a preview of the window).

As discussed above, Application 1, Application 3, and Application 7 are executing on the computing system and are generating sound. Sound indicators 708 are displayed in the window previews 731, 733, and 737, which are associated with Application 1, Application 3, and Application 7, respectively. Also as discussed above, sound indicators 708 may allow a user to adjust the volume of the sound generated by an application that is generating sound (e.g., by muting the sound generated by the application or by increasing/decreasing the volume of the sound generated by the application).

Figure 8:
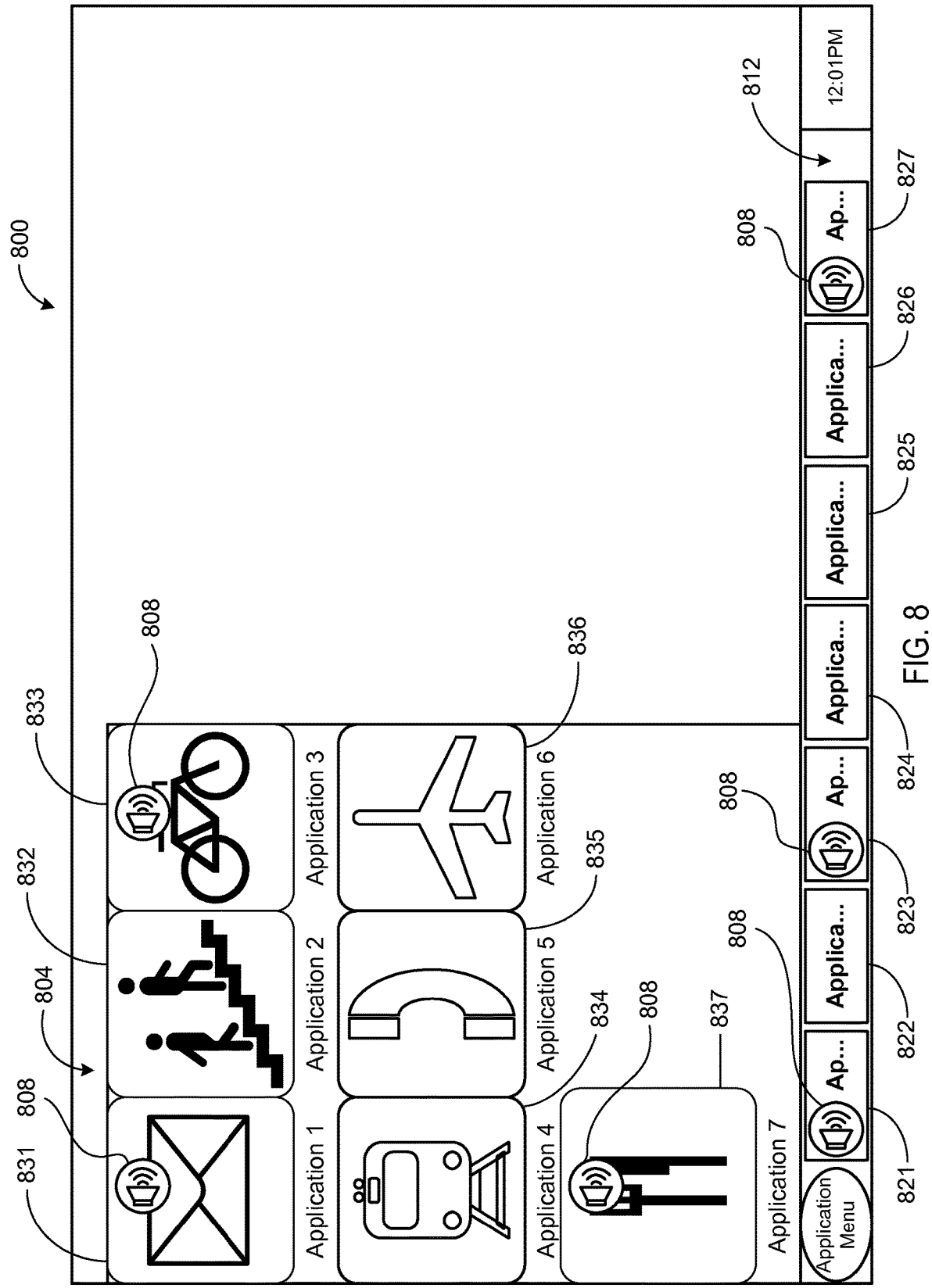
FIG. 8 is a diagram illustrating a fifth exemplary desktop environment, in accordance with one embodiment.

FIG. 8 is a diagram illustrating a fifth exemplary desktop environment 800, in accordance with one embodiment. Similar to FIG. 7, the desktop environment 800 includes a taskbar 812. In the exemplary desktop environment 800, the application windows associated with Applications 1 through 7 are hidden from the user view and the minimized application windows 821, 822, 823, 824, 825, 826, and 827 are shown on the taskbar 812, respectively. Application 1, Application 3, and Application 7 are generating sound and sound indicators 808 are displayed in the minimized application windows 821, 823, and 827, which are associated with Application 1, Application 3, and Application 7, respectively.

The desktop environment may also include an application group 804. In one embodiment, the application group 804 may comprise a graphical user interface component which allows users to access and launch applications. For example, the application group 804 may include shortcuts which may be used to launch applications. Application group 804 may include application shortcuts 831, 832, 833, 834, 835, 836, and 837 for launching Applications 1 through 7 respectively.

As discussed above, Application 1, Application 3, and Application 7 are executing on the computing system and are generating sound. Sound indicators 808 are displayed in the application shortcuts 831, 833, and 837, which are associated with Application 1, Application 3, and Application 7, respectively. Also as discussed above, sound indicators 808 may allow a user to adjust the volume of the sound generated by an application that is generating sound (e.g., by muting the sound generated by the application or by increasing/decreasing the volume of the sound generated by the application).

Figure 9:
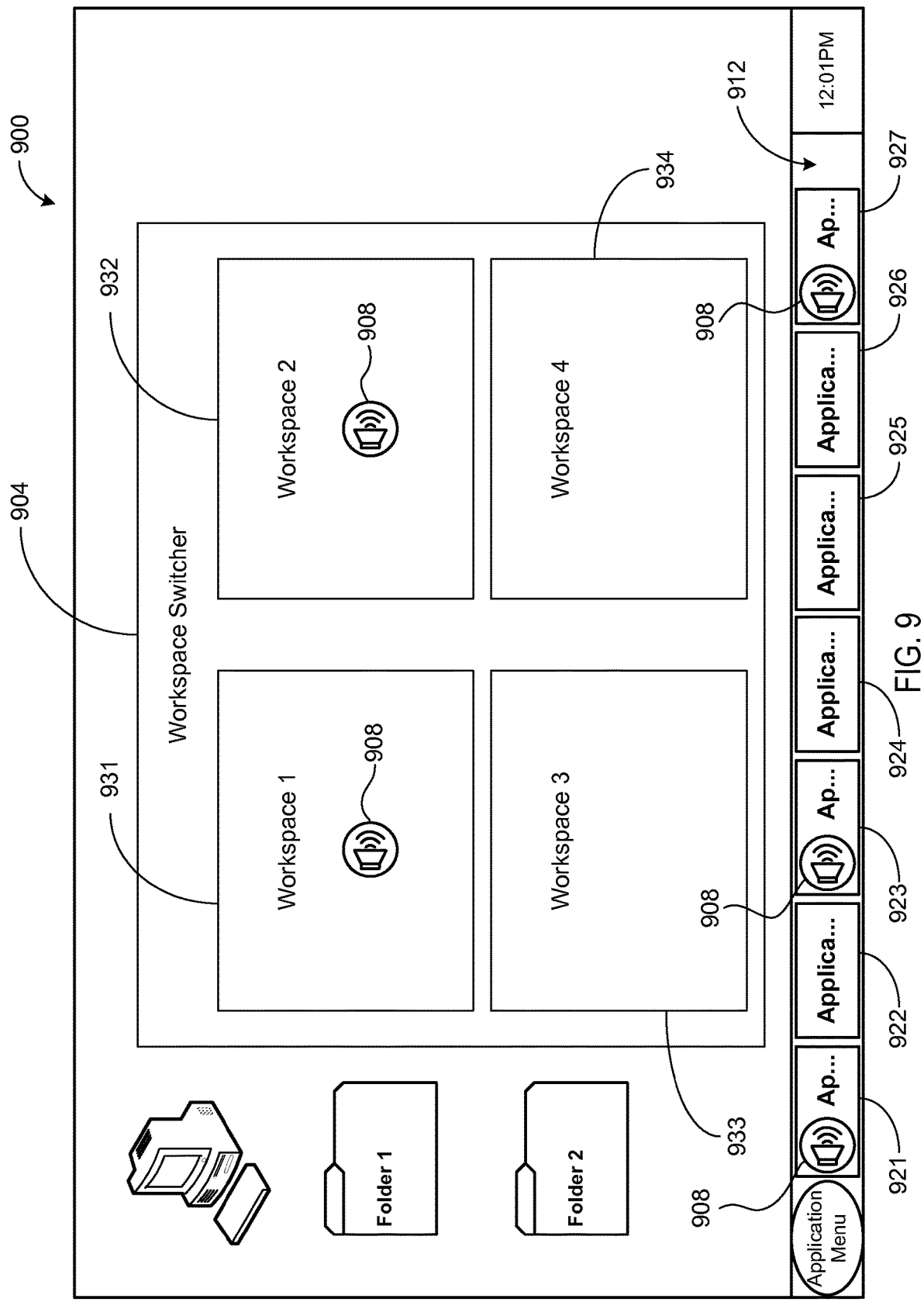
FIG. 9 is a diagram illustrating a sixth exemplary desktop environment, in accordance with one embodiment.

FIG. 9 is a diagram illustrating a sixth exemplary desktop environment 900, in accordance with one embodiment. Similar to FIG. 8, the desktop environment 900 includes a taskbar 912. In the exemplary desktop environment 900, the application windows associated with Applications 1 through 7 are hidden from the user view and the minimized application windows 921, 922, 923, 924, 925, 926, and 927 are shown on the taskbar 912, respectively. Application 1, Application 3, and Application 7 are generating sound and sound indicators 908 are displayed in the minimized application windows 921, 923, and 927, which are associated with Application 1, Application 3, and Application 7, respectively.

The desktop environment 900 may also include a workspace switcher 904. The computing system may comprise one or more workspaces. Each workspace may be associated with a desktop environment and/or a portion of a desktop environment. A workspace may provide a user with more locations to store and/or display files, application shortcuts, bookmarks, application windows, minimized application windows, taskbars, etc. For example, each workspace may only allow a user to store twenty application shortcuts/files on the desktop environment associated with the workspace. If a user has more than twenty application shortcuts/files, the user may place the extra application shortcuts/files in a different workspace. In another example, a user may start execution of different applications within different workspaces, in order to better organize the application windows associated with the different applications.

In one embodiment, the workspace switcher 904 may comprise a graphical user interface component which allows users to switch between workspaces. The workspace switcher 904 includes workspace previews 931, 932, 933, and 934. In another embodiment, a workspace preview may comprise a representation of the workspace associated with the workspace preview. For example, the workspace preview may comprise a small image of the workspace associated with the workspace preview.

In FIG. 9, Application 1, Application 3, and Application 7 are executing on the computing system and are generating sound. Applications 1 and 3 are associated with workspace preview 931. Application 7 is associated with workspace preview 932. Sound indicators 908 are displayed in the workspace previews 931 and 932. In particular, sound indicator 908 is displayed in the workspace preview 931 to indicate that applications associated with "Workspace 1" (e.g., Application 1 and Application 3) are generating sound. In addition, a different application (e.g., Application 7) associated with "Workspace 2" are also generating sound, and sound indicator 908 is also displayed in the workspace preview 932 to indicate that applications associated with "Workspace 2" are also generating sound. As discussed above, sound indicators 908 may allow a user to adjust the volume of the sound generated by an application that is generating sound (e.g., by muting the sound generated by the application or by increasing/decreasing the volume of the sound generated by the application).

Figure 10:
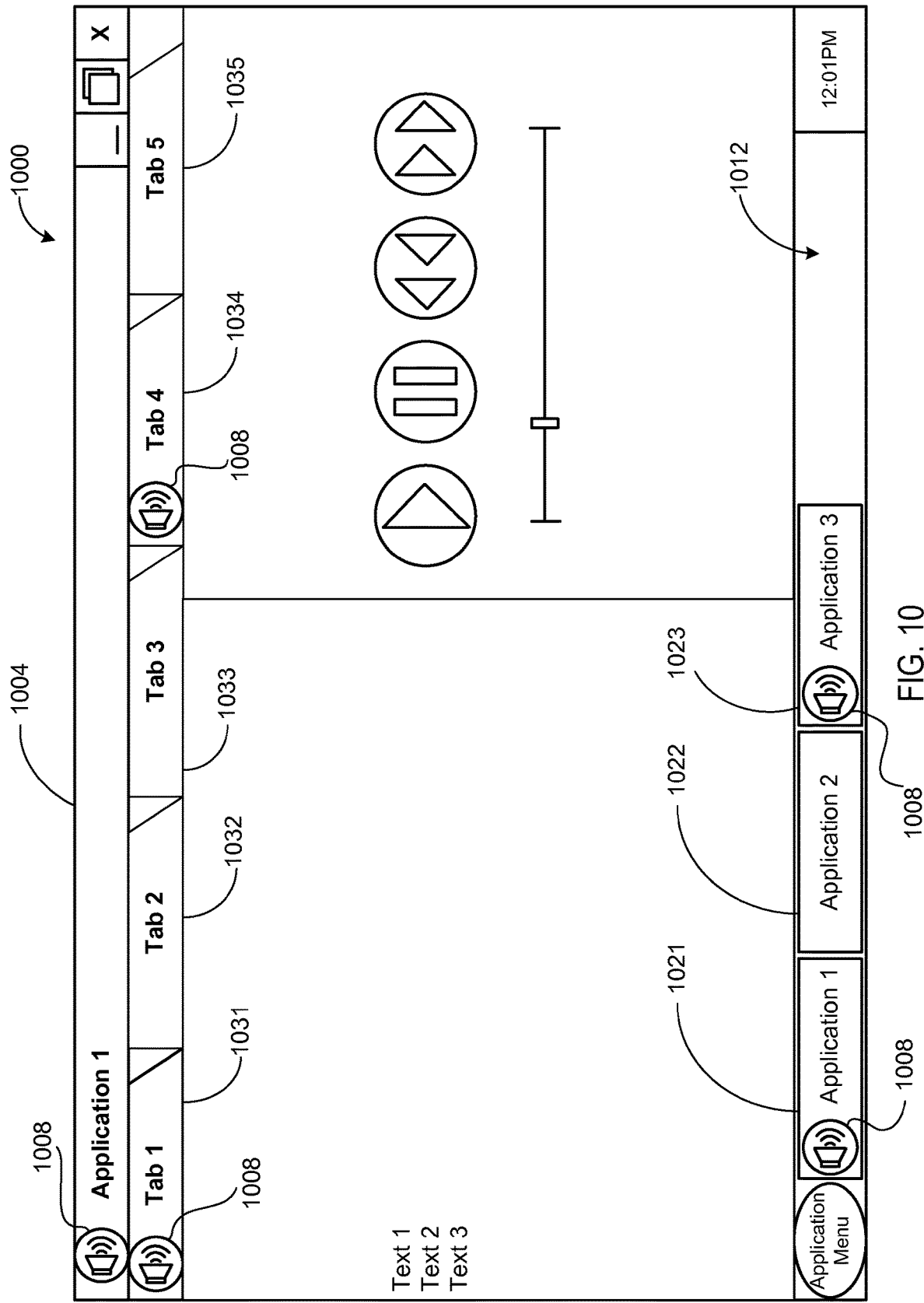
FIG. 10 is a diagram illustrating a seventh exemplary desktop environment, in accordance with one embodiment.

FIG. 10 is a diagram illustrating a seventh exemplary desktop environment 1000, in accordance with one embodiment. Similar to FIG. 4, the desktop environment 1000 includes a taskbar 1012. In the exemplary desktop environment 800, minimized application windows 1021, 1022, and 1023 are shown on the taskbar 1012. Application 1 and Application 3 are generating sound and sound indicators 1008 are displayed in the minimized application windows 1021 and 1023, which are associated with Application 1 and Application 3, respectively. The desktop environment 1000 includes an application window 1004 which is associated with Application 1 executing on the computing system. Application 1 is generating sound and the sound indicator 1008 is displayed within the application window 1004 to indicate that Application 1 is generating sound.

Application window 1004 includes application tabs 1031, 1032, 1033, 1034, and 1035. In one embodiment, an application tab may be used to access different features, different views, and/or different instantiations of an application. For example, a web browser application may include multiple tabs, each of the tabs displaying a different web page. In another example, a management application (e.g., a database management application) may include multiple tabs, each of the tabs associated with different functionality of the database management application (e.g., view tables, edit tables, view entries, etc.). Application tabs 1031 and 1034 are generating sound, and sound indicators 1008 are displayed on the application tabs 1031 and 1034 in addition to the sound indicator 1008 displayed on the application window 1004. As discussed above, sound indicators 1008 may allow a user to adjust the volume of the sound generated by an application that is generating sound (e.g., by muting the sound generated by the application or by increasing/decreasing the volume of the sound generated by the application).

Figure 11:
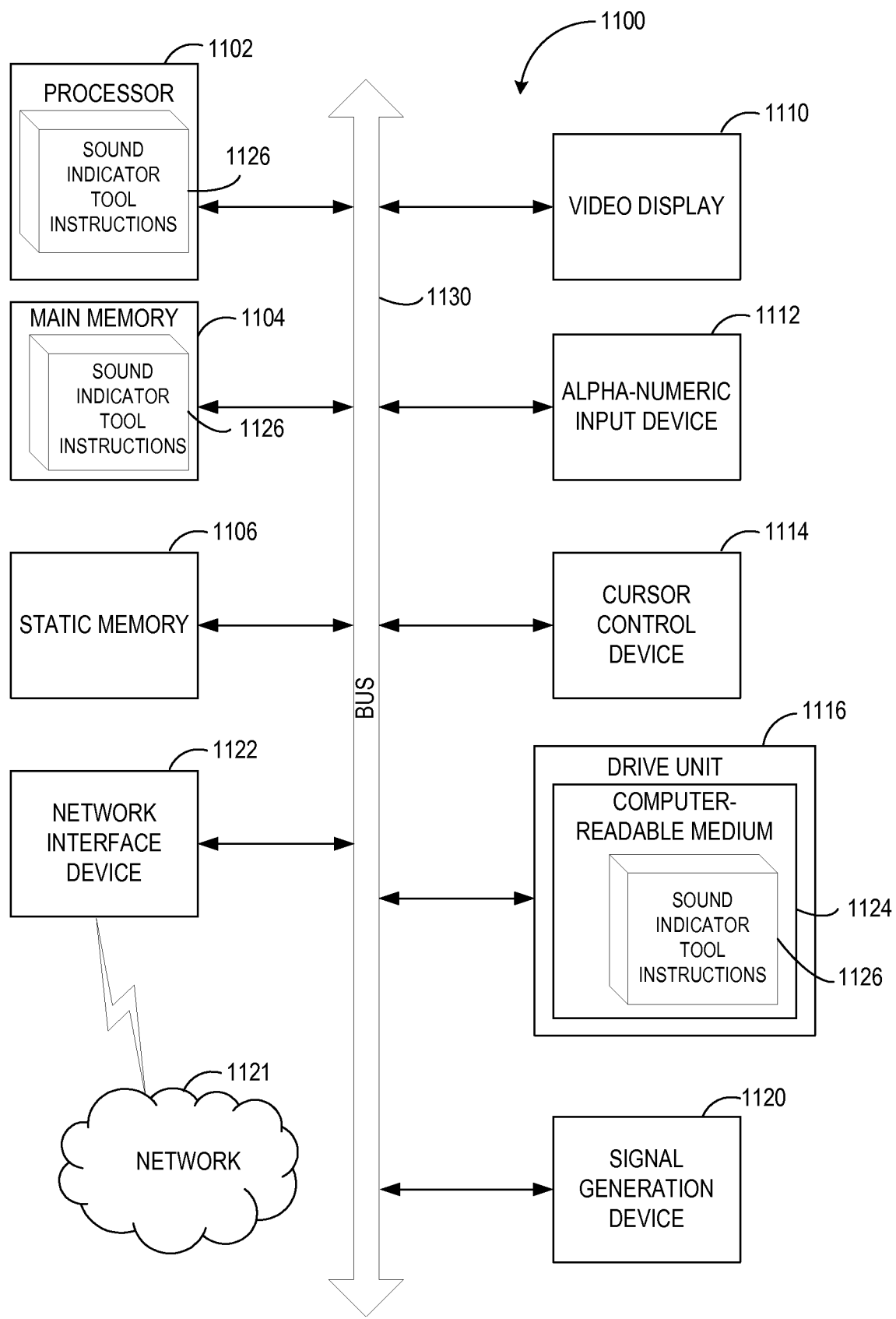
FIG. 11 illustrates a diagrammatic representation of a machine in the exemplary form of a computer system, in accordance with one embodiment.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a smartphone, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory 1116 (e.g., a data storage device), which communicate with each other via a bus 1130.

The processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 1102 may also be one or more special-purpose processing devices such as an application specific integrated circuit (ASIC), a field programmable gate array (FPGA), a digital signal processor (DSP), network processor, or the like. The processor 1102 is configured to execute sound indicator tool 116 for performing the operations and steps discussed herein.

The computer system 1100 may further include a network interface device 1122. The network interface device may be in communication with a network 1121. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The secondary memory 1116 may include a machine-readable storage medium (or more specifically a computer-readable storage medium) 1124 on which is stored one or more sets of instructions for sound indicator tool 116 embodying any one or more of the methodologies or functions described herein. The instructions of the sound indicator tool 116 may also reside, completely or at least partially, within the main memory 1104 and/or within the processing device 1102 during execution thereof by the computer system 1100, the main memory 1104 and the processing device 1102 also constituting machine-readable storage media. The instructions of the sound indicator tool 116 may further be transmitted or received over a network via the network interface device 1122.

While the machine-readable storage medium 1124 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "identifying", "determining", and "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    monitoring a plurality of applications executing on a computing system;
    identifying, by a processing device, a first application among the plurality of applications requesting access to a sound generating device to generate a first sound and a second application among the plurality of applications requesting access to the sound generating device to generate a second sound;
    responsive to identifying the first application and the second application, determining, by the processing device, that a volume level of the computing system is not on mute, and that a determined number of sound-related criteria are satisfied, wherein the sound-related criteria comprise:
        a first sound-related criterion that indicates that the first sound and the second sound meet a threshold volume level; and
        a second sound-related criterion that indicates that a user is accessing sound related controls; and
    responsive to determining that the determined number of sound-related criteria are satisfied, displaying a first sound indicator in a user interface in association with a first visual representation of the first application and a second sound indicator in the user interface in associated with a second visual representation of the second application, the first sound indicator indicating that the first application is generating the first sound and the second sound indicator indicating that the second application is generating the second sound, and the first sound indicator allowing for control of the first sound generated by the first application and the second sound indicator allowing for control of the second sound generated by the second application.

2. The method of claim 1, wherein the first and second sound indicators are displayed in at least one of:
    a window associated with the plurality of applications;
    a minimized window associated with the plurality of applications, wherein the minimized window is displayed in a taskbar;
    an application menu listing the plurality of applications;
    an application group listing the plurality of applications;
    an entry in a list of virtual machines;
    a workspace comprising the plurality of applications; or
    an application switcher listing the plurality of applications.

3. The method of claim 2, wherein the taskbar displays a window preview associated with the plurality of applications, and wherein the first sound indicator and the second sound indicator are also displayed in the window preview.

4. The method of claim 2, wherein the application switcher displays a window preview associated with the plurality of applications, and wherein the first sound indicator and the second sound indicator are also displayed in the window preview.

5. The method of claim 2, wherein the window associated with the plurality of applications comprises a first tab and a second tab, and wherein the first sound indicator is displayed in the first tab and the second sound indicator is displayed in the second tab.

6. The method of claim 1, wherein the first and second sound indicators comprise at least one of: an image or an animation.

7. The method of claim 1, wherein the second sound-related criterion is satisfied responsive to receiving a user input for sound related controls.

8. The method of claim 7, wherein the sound related controls comprise a volume controller for the computing system.

9. The method of claim 1, wherein the monitoring is performed by an operating system.

10. An apparatus comprising:
    a memory; and
    a processing device, operatively coupled to the memory, to:
        monitor a plurality of applications executing on a computing system;
        identify a first application among the plurality of applications requesting access to a sound generating device to generate a first sound and a second application among the plurality of applications requesting access to the sound generating device to generate a second sound;
        responsive to identifying the first application and the second application, determine that a volume level of the computing system is not on mute, and that a determined number of sound-related criteria are satisfied, wherein the sound-related criteria comprise:
            a first sound-related criterion that indicates that the first sound and the second sound meet a threshold volume level; and a second sound-related criterion that indicates that a user is accessing sound related controls; and responsive to determining that the determined number of sound-related criteria are satisfied, display a first sound indicator in a user interface in association with a first visual representation of the first application and a second sound indicator in the user interface in associated with a second visual representation of the second application, the first sound indicator indicating that the first application is generating the first sound and the second sound indicator indicating that the second application is generating the second sound, and the first sound indicator allowing for control of the first sound generated by the first application and the second sound indicator allowing for control of the second sound generated by the second application.

11. The apparatus of claim 10, wherein the first and second sound indicator are displayed in at least one of:
a window associated with the plurality of applications;
a minimized window associated with the plurality of applications, wherein the minimized window is displayed in a taskbar;
an application menu listing the plurality of applications;
an application group listing the plurality of applications;
an entry in a list of virtual machines;
a workspace comprising the plurality of applications; or
an application switcher listing the plurality of applications.

12. The apparatus of claim 11, wherein the taskbar displays a window preview associated with the plurality of applications, and wherein the first sound indicator and the second sound indicator are also displayed in the window preview.

13. The apparatus of claim 11, wherein the application switcher displays a window preview associated with the plurality of applications, and wherein the first sound indicator and the second sound indicator are also displayed in the window preview.

14. The apparatus of claim 11, wherein the window associated with the plurality of applications comprises a first tab and a second tab, and wherein the first sound indicator is displayed in the first tab and the second sound indicator is displayed in the second tab.

15. The apparatus of claim 10, wherein the first and second sound indicators comprise at least one of: an image or an animation.

16. The apparatus of claim 10, wherein the second sound-related criterion is satisfied responsive to receiving a user input for sound related controls.

17. The apparatus of claim 16, wherein the sound related controls comprise a volume controller for the computing system.

18. The apparatus of claim 10, wherein one or more of the sound monitoring tool, the application identification tool, the sound criteria tool, and the first sound indicator generator is part of an operating system.

19. A non-transitory computer readable storage medium comprising instructions that, when executed by a processing device, cause the processing device to:
monitor a plurality of applications executing on a computing system;
identify a first application among the plurality of applications requesting access to a sound generating device to generate a first sound and a second application among the plurality of applications requesting access to the sound generating device to generate a second sound;
responsive to identifying the first application and the second application, determine that a volume level of the computing system is not on mute, and that a determined number of sound-related criteria are satisfied, wherein the sound-related criteria comprise:
a first sound-related criterion that indicates that the first sound and the second sound meet a threshold volume level; and
a second sound-related criterion that indicates that a user is accessing sound related controls; and
responsive to determining that the determined number of sound-related criteria are satisfied, display a first sound indicator in a user interface in association with a first visual representation of the first application and a second sound indicator in the user interface in associated with a second visual representation of the second application, the first sound indicator indicating that the first application is generating the first sound and the second sound indicator indicating that the second application is generating the second sound, and the first sound indicator allowing for control of the first sound generated by the first application and the second sound indicator allowing for control of the second sound generated by the second application.

20. The non-transitory computer readable storage medium of claim 19, wherein the first and second sound indicators are displayed in at least one of:
a window associated with the plurality of applications;
a minimized window associated with the plurality of applications, wherein the minimized window is displayed in a taskbar;
an application menu listing the plurality of applications;
an application group listing the plurality of applications;
an entry in a list of virtual machines;
a workspace comprising the plurality of applications; or
an application switcher listing the plurality of applications.

21. The non-transitory computer readable storage medium of claim 20, wherein the taskbar displays a window preview associated with the plurality of applications, and wherein the first sound indicator and the second sound indicator are also displayed in the window preview.

22. The non-transitory computer readable storage medium of claim 20, wherein the application switcher displays a window preview associated with the plurality of applications, and wherein the first sound indicator and the second sound indicator are also displayed in the window preview.

23. The non-transitory computer readable storage medium of claim 20, wherein the window associated with the plurality of applications comprises a first tab and a second tab, and wherein the first sound indicator is displayed in the first tab and the second sound indicator is displayed in the second tab.

24. The non-transitory computer readable storage medium of claim 19, wherein the first and second sound indicators comprise at least one of: an image or an animation.

25. The non-transitory computer readable storage medium of claim 19, wherein the second sound-related criterion is satisfied responsive to receiving a user input for sound related controls.

26. The non-transitory computer readable storage medium of claim 25, wherein the sound related controls comprise a volume controller for the computing system.

27. The non-transitory computer readable storage medium of claim 19, wherein the monitor is performed by an operating system.

* * * * *